Figure 3:
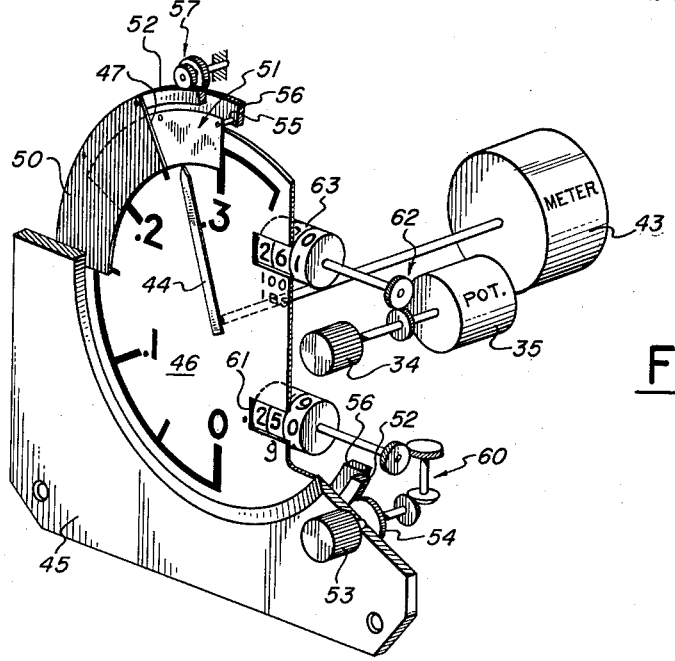

Feb. 12, 1963
T. GOLD
3,077,109
AIRCRAFT TAKE-OFF PERFORMANCE MONITORING APPARATUS
Filed June 17, 1959
2 Sheets-Sheet 1
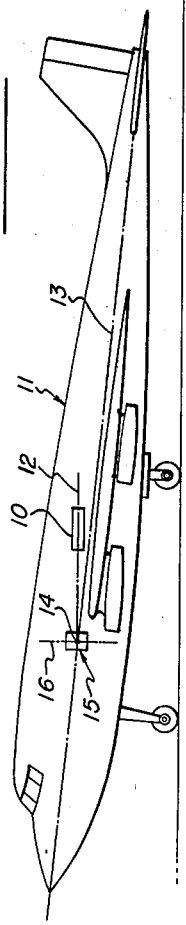
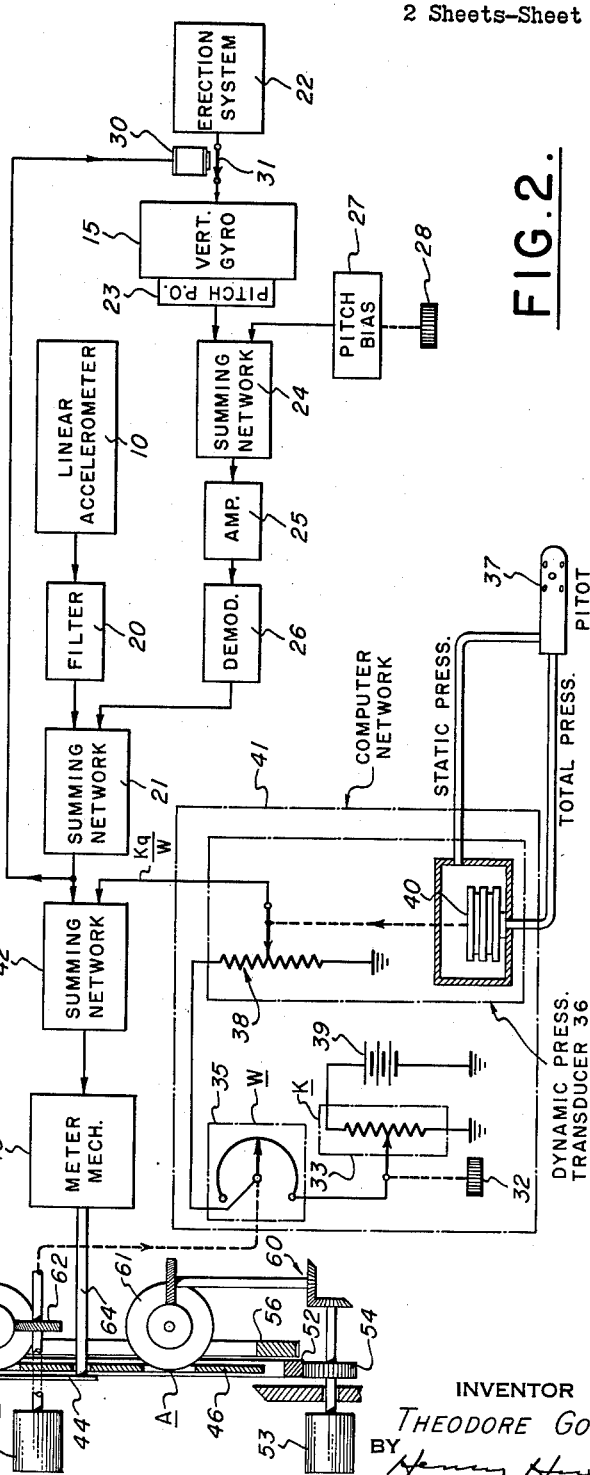
INVENTOR
THEODORE GOLD
BY
ATTORNEY Feb. 12, 1963 T. GOLD 3,077,109
AIRCRAFT TAKE-OFF PERFORMANCE MONITORING APPARATUS
Filed June 17, 1959 2 Sheets-Sheet 2

INVENTOR
THEODORE GOLD
BY
ATTORNEY

United States Patent Office 3,077,109
Patented Feb. 12, 1963

3,077,109
AIRCRAFT TAKE-OFF PERFORMANCE
MONITORING APPARATUS
Theodore Gold, Ronkonkoma, N.Y., assignor to Sperry Rand Corporation, a corporation of Delaware
Filed June 17, 1959, Ser. No. 821,035
2 Claims. (Cl. 73—178)

This invention relates to a system for monitoring the take-off performance of an aircraft. More particularly, it concerns a system for accurately providing a continuous comparison of the actual performance of the aircraft during the take-off run with the performance required for the aircraft to become safely airborne in which the system is compensated for pitch attitude changes of the aircraft during the take-off run.

The system of the present invention is an improvement over the system described in the National Advisory Committee for Aeronautics Technical Note 3252, entitled "Description and Preliminary Flight Investigation of an Instrument for Detecting Subnormal Acceleration During Take-off" by Garland J. Morris and Lindsay J. Lina dated November, 1954. The system described utilizes an accelerometer mounted within the aircraft responsive to the longitudinal acceleration experienced by the craft. It is pointed out in the report that an indication of longitudinal acceleration alone is not suitable for providing an indication of malfunction because the longitudinal acceleration of an airplane normally decreases during the take-off run as a result of increasing aerodynamic drag and decreasing net thrust. With this condition, the pilot might be unable to distinguish between a deficiency in acceleration due to malfunction and a normal decrease in acceleration. To provide a constant predictable indication of aircraft performance when performance is normal, the above system incorporates a dynamic pressure sensing element combined with the accelerometer to provide an indication of longitudinal acceleration compensated by dynamic pressure. Any deviation in acceleration during the take-off run is then detectable as a departure of the indication from the expected constant value.

However, the foregoing system has serious limitations when utilized with aircraft whose pitch attitude changes during the take-off run. As the aircraft pitch attitude changes, the accelerometer responds to a component of gravity acceleration as well as to the longitudinal acceleration thereby providing an erroneous indication. The error due to the gravity component may be sufficient to mask the actual performance of the aircraft. Depending upon the direction of the change of pitch attitude, the error may result in an indication that the aircraft performance is satisfactory when in reality it is not or vice versa. While it is absolutely necessary to determine submarginal aircraft performance during take-off for obvious reasons, it is also desirable to avoid unnecessary abortion of the take-off when aircraft performance is satisfactory. An abortion of the take-off of a modern jet airplane usually results in considerable discomfort to the occupants as well as wearing out the brake linings and tires which must then be replaced.

It is therefore a primary object of the present invention to provide a take-off monitor for aircraft that continuously and accurately monitors performance of the aircraft from the beginning of the take-off run.

It is an additional object of the present invention to provide a take-off monitor for aircraft that continuously compensates for changes in the pitch attitude of the aircraft and thereby accurately monitors the performance of the aircraft during the take-off run.

It is a further object of the present invention to provide a take-off monitor for aircraft that continuously compensates by means of a vertical reference device for changes in the pitch attitude of the craft and corrects for acceleration effects which would otherwise cause errors in the vertical reference means.

The present invention achieves the above objects by means of an accelerometer mounted within the aircraft responsive to the forward acceleration experienced by the aircraft during the take-off run for providing a signal accordingly. As the aircraft proceeds along the runway during the take-off, the pitch attitude of the craft changes and the accelerometer senses a component of the gravity vertical acceleration. A vertical gyroscope is connected to provide a signal representative of the angle through which the aircraft has rotated about the pitch axis to correct for the gravity component of the sensed acceleration signal. Means are also provided for eliminating the effects caused by the vertical gyro erection system being responsive to the forward acceleration of the aircraft. The sensed acceleration signal, as corrected, is algebraically combined with a signal that compensates for the decrease in acceleration with increasing air speed as the aircraft proceeds down the runway. This combined signal energizes a meter movement which rotates a pointer. The acceleration required for the aircraft to become successfully airborne is determined by reference to performance charts and atmospheric data. An index representative of the required acceleration is set manually. By visually comparing the position of the pointer with respect to the position of the manually set index, the performance of the aircraft during take-off may be continuously monitored from the beginning of the take-off run. Under normal conditions, the pointer is continuously driven beyond the set index.

The performance of an aircraft during the take-off maneuver may be evaluated by considering the relationships between the variation of acceleration, time and distance, namely:

$$dV = a\, dt \tag{a}$$
$$dS = V\, dt \tag{b}$$
and (1)

$$dS = \frac{V\, dV}{a} \tag{c}$$

In order to apply these relationships to an aircraft during the take-off maneuver, the forces acting on the aircraft must be considered. The equilibrium equation of the longitudinal forces yields:

$$\epsilon F = T - D - F_\mathrm{F} - W \sin \theta - \frac{W}{g} a_x = 0 \tag{2}$$

where
$T =$ thrust
$D =$ drag
$F_\mathrm{F} =$ rolling friction force $= \mu(W - L)$
$W =$ gross weight
$\mu =$ coefficient of rolling resistance between tires and runway
$L =$ lift
$g =$ gravitational constant
$a_x =$ forward horizontal acceleration
$\theta =$ runway inclination, upgrade being positive solving Equation 2 for $a_x$ $$a_x = \frac{g}{W}[T - D - \mu(W - L) - W \sin \theta] \tag{3}$$

The thrust of an airplane is a function of the airplane speed, power configuration, and atmospheric conditions. This function may be approximated by the relationship $$T = T_\mathrm{S} - V_e^2 \frac{dT}{dV_e^2} \tag{4}$$

where $T_\mathrm{S}$ is static thrust which is a function of atmospheric pressure, temperature, and the power configuration; $V_e$ is equivalent airspeed and $dT/dV_e^2$ is the variation of thrust with $V_e^2$ for the best linear approximation. Another form of Equation 4 will be useful.

$$T = T_S - K_T q$$

where
$q$ = dynamic pressure ($\frac{1}{2}\rho_0 V_e^2$)
$\rho_0$ = atmospheric density for standard sea level conditions, and $$K_T = \frac{2}{\rho_0} \frac{dT}{dV_e^2}$$

The angle of attack of the aircraft during the take-off run may be assumed to remain constant, therefore:

$$L = qAC_L \quad D = qAC_D \tag{5}$$

where $C_L$ and $C_D$ are lift and drag coefficients, respectively, in the taxi attitude and $A$ is the wing area.
Substituting Equations 4 and 5 in 3 yields $$a_x = \frac{g}{W}[T_s - \mu W - q(AC_D - \mu AC_L + K_T) - W \sin \theta] \tag{6}$$

or $$a_x = \frac{g}{W}[T_o - k$$

where $$T_o = T_s - W(\mu + \sin \theta)$$
$$k = AC_D - \mu C_L A + K_T$$

or $$a_x = a_c - \frac{Kq}{W} \quad \text{where } K = kg$$

and $$a_c = a_x + \frac{Kq}{W} \tag{7}$$

where $$a_c = \frac{T_o g}{W} = \text{equivalent or initial acceleration at } q = 0$$

This relationship represents the expected variations of forward acceleration with dynamic pressure. The value of $$\frac{T_o g}{W}$$

is constant for any given take-off and can be determined as a function of engine performance, gross weight, atmospheric conditions and runway gradient, as formulated above. It represents the initial acceleration which should be experienced at the time of brake release at the beginning of the take-off run when the velocity of the aircraft is zero. The term $$\frac{Kq}{W}$$

represents the expected decrease of acceleration as a function of changes in aerodynamic drag and engine thrust with increasing air speed. This equation, as corrected for pitch attitude changes, represents the basis of the comparison that is continuously displayed during the take-off run by the take-off monitor system of the present invention.

Figure 5:
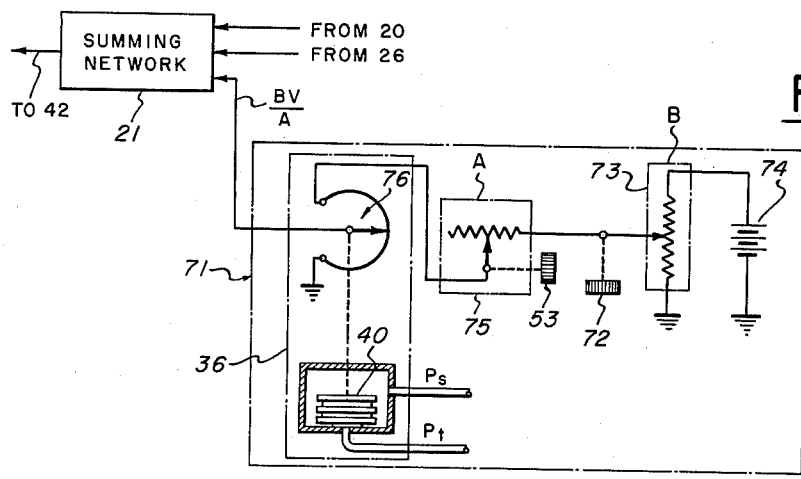
Figure 4:
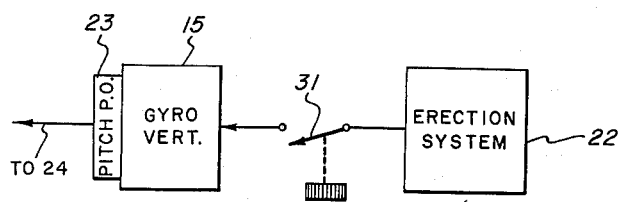

The invention will now be described with reference to the following drawings in which:

FIG. 1 is a side view of an aircraft having components of the invention mounted therein, FIG. 2 is a schematic block diagram of a preferred embodiment of a take-off monitoring system, FIG. 3 is a perspective, partly in section, of the take-off monitor display for the system of FIG. 1, FIG. 4 is an alternative embodiment for disconnecting the erection system of FIG. 2, and FIG. 5 is an alternative embodiment of the system of FIG. 1.

Referring now to FIG. 1, a linear accelerometer 10 is shown mounted in an aircraft 11. The sensitive axis 12 of accelerometer 10 is disposed parallel to the horizon with the aircraft 11 in its normal taxi position as shown in FIG. 1. In the taxi position, the longitudinal axis 13 of aircraft 11 is not necessarily parallel to the horizon and in fact it is usually at an angle thereto as indicated. In the position shown in FIG. 1, accelerometer 10 is responsive to the forward acceleration of the aircraft only and provides a D.C. signal having a magnitude proportional thereto.

However, as the airplane 11 proceeds along the runway during the take-off run, it rotates around its pitch axis 14. The rotation of the aircraft 11 tilts the sensitive axis 12 of accelerometer 10 causing the accelerometer to sense an undesired component of gravity acceleration. The undesired component of gravity acceleration is compensated by means of a vertical gyro 15 in a manner to be explained with respect to FIG. 2.

As shown in FIG. 2, linear accelerometer 10 is connected through a filter circuit 20 to a summing network 21. As explained above, the signal from accelerometer 10 is substantially representative of the forward acceleration of the aircraft but may also include a component of the gravity acceleration. To provide a corrective pitch signal, vertical gyro 15 is mounted in the aircraft, with its sensitive axis 16 normally maintained vertical, as shown in FIG. 1, by means of a gyro erection system 22. A pitch pick-off 23 connected to vertical gyro 15 provides an A.C. signal representative of the pitch attitude of the aircraft. The amplitude and sense of the pitch signal is dependent upon the magnitude and direction of the deviation of the longitudinal axis 13 of the aircraft 11 from the horizontal. The pitch pick-off 23 is connected to summing network 24 which in turn is connected to amplifier 25 and thence to phase sensitive demodulator 26. Demodulator 26 is connected to provide a second D.C. input to summing network 21.

A pitch bias circuit 27 is also connected to summing network 24. Pitch bias circuit 27 is adjusted by means of knob 28 to provide a bias signal to summing network 24 in opposition to the signal provided by pitch pick-off 23. The pitch bias signal corrects for the pitch attitude of the aircraft 11 in its taxi position to provide a zero signal output from summing network 24 when the aircraft is standing on the runway at the beginning of the take-off run.

As the aircraft 11 proceeds down the runway during the take-off run and its pitch attitude changes, vertical gyro 15 provides a signal representative of the change of pitch attitude to summing network 21 to correct the acceleration signal for the gravity component sensed by the accelerometer 10. The output signal from summing network 21 is a corrected acceleration signal $a_x$ which accurately represents the forward acceleration of the aircraft.

Under the influence of the forward acceleration experienced by the aircraft, the erection system 22 would normally erect vertical gyro 15 to a false vertical thereby introducing errors in the pitch attitude signal. To prevent this, relay 30 is connected to the output terminal of summing network 21. Relay 30 is energized when the acceleration signal reaches a predetermined relatively low magnitude. Energization of relay 30 opens normally closed switch 31 connected between erection system 22 and vertical gyro 15 to disconnect the erection system. The vertical gyro 15 then operates in an unslaved condition with its vertical axis 16 substantially vertical except for gyroscopic drift effects. During the short period of the take-off run, the gyroscopic drift effects are negligible.

As the aircraft proceeds down the runway during the take-off run, its forward acceleration decreases in a normal manner due to increasing aerodynamic drag, decreasing engine thrust and increasing rolling friction. For reasons explained previously, the acceleration signal is compensated by a signal representative of the $$\frac{Kq}{W}$$

term of the above-mentioned formula to provide a stable display during normal operation. As derived above, the K factor depends upon the aerodynamic characteristics of the particular aircraft which can be obtained by reference to manufacturer's data. A signal representative of the K term is provided by manually adjusting knob 32 to position the slider of potentiometer 33. A D.C. voltage source 39 is applied across the resistive winding of potentiometer 33. A signal representative of the gross weight W is obtained by manually adjusting knob 34 which positions the slider of potentiometer 35.

A signal representative of the dynamic pressure $q$ is obtained from a dynamic pressure transducer 36. The dynamic pressure transducer 36 is responsive to the actual static and total pressure as obtained from a Pitot tube 37. Transducer 36 positions the slider of potentiometer 38 in accordance with dynamic pressure by means of bellows 40.

The potentiometers 33, 35 and 38 are interconnected to form a D.C. computer network 41 which provides a signal representative of the $$\frac{Kq}{W}$$

factor. The output terminal of the computer network 41 is connected to an input terminal of summing network 42. The other input terminal of summing network 42 is connected to the output terminal of summing network 21. Summing network 42 algebraically sums the corrected acceleration signal $a_x$ and the $$\frac{Kq}{W}$$

signal to provide an output signal representative of the actual aircraft performance which remains substantially constant during the take-off run under normal operation.

The output signal from summing circuit 42 is connected to energize D.C. meter movement 43. Meter movement 43 is mechanically connected to drive pointer 44 in accordance with the output signal.

Referring now to FIGS. 2 and 3, the take-off monitor display is disposed within a housing 45 that is mounted preferably on the instrument panel of the aircraft. A fixed dial 46 is viewed through a circular opening in the housing 45. Dial 46 has graduations thereon representative of acceleration measures. Also viewable through the opening and extending around a portion of the periphery of dial 46 is an adjustable cross-hatched mask 50. A second adjustable mask 51 also extends around a portion of the periphery of dial 46. Mask 51 is slidable behind mask 50 in a manner to be more fully described. Mask 51 preferably is painted a solid color or is otherwise painted to contrast with the color of mask 50 to provide a line of demarcation 47 therebetween. Masks 50 and 51 are well as line 47 are cooperative with the graduations on dial 46.

Mask 50 is mounted on ring gear 52 and movable therewith. Ring gear 52 is connected to be driven by manual rotation of the acceleration set knob 53 through gear 54 which meshes with gear 52. Mask 51 is connected by arms 55 to ring gear 56 for rotation therewith. Ring gear 56 is connected to be driven by ring gear 52 by means of step-up gear drive 57. Rotation of knob 53 thus rotates ring gears 52 and 56 simultaneously but mask 51 is driven at a faster rate than mask 50. Thus, at any particular setting of knob 53, mask 51 protrudes beyond mask 50 for an arcuate extent equivalent to a predetermined fixed percentage.

Knob 53 is connected by gearing 60 to drive counter 61 which is viewed through a rectangular opening in dial 46. Knob 34 is connected by gearing 62 to a drive counter 63 which is viewed through another rectangular opening in dial 46.

Pointer 44 is connected to meter movement 43 by a shaft 64 which protrudes through an aperture in the center of dial 46. Pointer 44 rotates over the face of dial 46 and is cooperative with the graduations thereon. Pointer 44 is also cooperative with masks 50 and 51 and the line of demarcation 47 therebetween. The line of demarcation 47 is indicative of the minimum acceptable performance required for a safe take-off as will be more fully explained with respect to the operation of the above-described system.

In the operation of the aforementioned system, the minimum acceptable take-off performance for equivalent acceleration measure is manually set by adjusting knob 53 until demarcation line 47 and counter 61 indicate the desired value, for example, .250 g's as shown in FIG. 3. This value varies from take-off to take-off and may be determined in several ways which will be explained subsequently. The gross weight of the aircraft, may also vary particularly for transport and bomber aircraft. The gross weight of the aircraft for the particular take-off is set by adjusting knob 34 until counter 63 reads accordingly. Potentiometer 35 is synchronized with counter 63 in order that rotation of knob 34 simultaneously provides an electrical signal representative of the gross weight of the aircraft to computer network 41.

Knob 32 is adjusted to provide a signal representative of the aerodynamic characteristics of the aircraft K from potentiometer 33 to computer network 41. Pitch bias knob 28 is adjusted to provide a pitch bias signal which corrects for the pitch attitude of the aircraft at the beginning of the take-off run.

As the aircraft proceeds along the runway at the beginning of the take-off run, accelerometer 10 is responsive to the forward acceleration of the aircraft. The forward acceleration signal energizes meter movement 43 which rotates pointer 44 to provide an immediate indication of the actual performance of the aircraft. Pointer 44 may be visually compared with demarcation line 47 to continuously monitor the performance of the aircraft. Normally, pointer 44 will be driven in a clockwise direction to some position beyond line 47 and adjacent mask 51. If performance is marginal, pointer 44 will be aligned with line 47. If performance is submarginal, pointer 44 will be to the left of line 47 and adjacent the cross-hatched mask 50. As the aircraft continues to proceed down the runway, accelerometer 10 continuously provides acceleration information which actuates pointer 44 whereby the performance of the aircraft is continuously monitored. This allows the pilot to scan the take-off monitor display at his option.

At the beginning of the take-off run, there is no pitch correction signal into summing network 21 because pitch bias circuit 27 has corrected the pitch attitude signal from vertical gyro 15 for the initial pitch attitude of the aircraft. Computer network 41 does not provide any input signal to summing network 42 because the air speed of the aircraft is not sufficient to provide a dynamic pressure signal of any consequence. Early in the take-off run, relay 30 is energized by an acceleration signal of relatively low magnitude to open switch 31 and disconnect erection system 22. This prevents the vertical gyro 15 from precessing to a false vertical.

As the aircraft continues down the runway, the air speed continues to increase while the actual forward acceleration decreases due to the effects of aerodynamic drag, engine thrust, and rolling friction, as explained previously. The increase in air speed causes an increase in dynamic pressure to be sensed by dynamic pressure transducer 36 by means of Pitot tube 37. Transducer 36 positions the slider of its potentiometer 38 accordingly and by means of computer network 41 a signal representative of $$\frac{Kq}{W}$$

is provided to summing network 42. As explained above, the $$\frac{Kq}{W}$$

signal compensates for the decrease in acceleration in order that pointer 44 is maintained in a substantially constant position providing the take-off is proceeding normally. Variations in head-wind are automatically compensated in this manner.

At some point during the take-off, the aircraft will begin to rotate about its pitch axis which will cause linear accelerometer 10 to be responsive to a component of the gravity vertical. The unslaved vertical gyro 15 senses the change in pitch attitude and provides a signal representative thereof from its pitch pick-off 23 to summing network 24. The output signal of summing network 24 is representative of the pitch attitude change from the normal taxi attitude of the aircraft due to pitch bias circuit 27. The pitch correction signal from summing network 24 is amplified in amplifier 25 and demodulated in demodulator 26 to provide a D.C. input to summing network 21 representative of the direction and magnitude of the pitch attitude change. This pitch correction signal opposes the signal of the gravity component sensed by accelerometer 10. The output from summing network 21 is thus truly representative of the forward acceleration of the aircraft. The normal decrease in the forward acceleration signal is compensated in summing network 42 by the $$\frac{Kq}{W}$$

signal to provide a substantially constant signal representative of the instantaneous performance of the aircraft to actuate pointer 44.

During the entire take-off, the take-off monitor display of the present invention continuously presents to the pilot the actual instantaneous performance of the aircraft compared with the desired performance. When the point is reached on the runway at which the pilot must decide whether to continue the take-off or to discontinue it, he has been constantly apprised of the relative performance of the aircraft. With pointer 44 adjacent the cross-hatched mask 50, he should discontinue the take-off. With pointer 44 adjacent line 47, performance is marginal but a take-off may be safely accomplished. With pointer 44 adjacent solid color mask 51, performance is normal and take-off is definitely indicated.

The design of the masks 50 and 51 may be varied to suit the particular aircraft requirements. For example, it may be desirable with certain types of aircraft to provide a lubber line on mask 51 which is indicative of the normal performance of the aircraft. With this arrangement, the lubber line may be spaced from the demarcation line 47 by a distance representative of a particular percentage decrease of aircraft performance which in turn is related to the increased take-off distance required. For example, the lubber line might be spaced from line 47 by an amount representative of a 7% decrease in performance which would require a 10% increase in the take-off distance.

The minimum acceptable take-off performance or equivalent acceleration may be determined in several ways. For single engine jet fighter aircraft, it may be representative of the acceleration which is normally provided by the static thrust of the aircraft when the air speed is zero. With a single engine plane, the only requirement may be to determine whether the acceleration is adequate, since engine failure eliminates any question regarding take-off. In multi-engine bomber or transport aircraft, on the other hand, the minimum acceptable take-off performance value may be dependent upon the acceleration available with one engine out since the aircraft may be able to take off with the remaining engines operating normally. Another consideration is the distance required to stop the aircraft after a decision to discontinue the take-off has been reached.

Alternative means of providing pitch compensation may also be utilized. For example, linear accelerometer 10 may be mounted on a platform stabilized in pitch in order to maintain the sensitive axis 12 of accelerometer 10 horizontal. Alternatively, accelerometer 10 may be mounted on a rotatable platform which is driven by a signal representative of the changes in pitch attitude from vertical gyro 15 to maintain the sensitive axis 12 horizontal. With its sensitive axis 12 maintained horizontal, accelerometer 10 will provide a signal representative of the true forward acceleration.

While an automatic means for disconnecting the erection system 22 from vertical gyro 15 has been shown, in certain embodiments, it may be desirable to manually disconnect the erection system 22, for example, as shown in FIG. 4, where switch 31 may be disconnected by manual operation of knob 70.

In other instances it may be undesirable to disconnect the erection system 22 from vertical gyro 15. Since the erection system 22 is responsive to the forward acceleration of the aircraft, it will then precess the vertical gyro 15 to a false vertical. Under the influence of forward acceleration of the magnitude experienced during take-off, the erection system 22 becomes saturated and slaves vertical gyro 15 at a maximum erection rate. Since the error introduced is proportional to the maximum erection rate and its duration, it can be eliminated by introducing a compensation signal of opposite magnitude for the same interval of time.

Referring now to FIG. 5, there is shown a computing network 71 which provides a signal for compensating the pitch attitude signal for errors due to the erection system being responsive to the forward acceleration. The compensating signal provided by network 71 is representative of $$\frac{BV}{A}$$

where B is representative of the maximum erection rate of erection system 22 (shown in FIG. 2), V is representative of the air speed of the aircraft and A is representative of the desired acceleration. The $$\frac{V}{A}$$

term is representative of the time function.

The signal representative of the maximum erection rate of the erection system, B, is provided by manually adjusting knob 72 to position the slider of potentiometer 73. A constant voltage source 74 is connected across the winding of potentiometer 73. A signal representative of the desired acceleration A is obtained by connecting the slider of a potentiometer 75 to knob 53 and adjusting knob 53 to position the slider accordingly.

A signal representative of the air speed of the craft may be obtained by providing the dynamic pressure transducer 36 shown in FIG. 1 with a second potentiometer 76. The winding of potentiometer 76 is wound to provide a square root function proportional to the position of its slider. By connecting the slider of potentiometer 76 to bellows 40 of dynamic pressure transducer 36, the output from potentiometer 76 is a signal representative of the square root of the dynamic pressure which is proportional to air speed V.

The potentiometers 73, 75 and 76 are interconnected to form the D.C. computer network 71 which provides a signal representative of the term $$\frac{BV}{A}$$

to summing network 21. In this manner as the aircraft proceeds along a runway, a compensating signal is provided to cancel the error due to the erection system 22 erecting vertical gyro 15 to a false vertical.

Obtaining the $$\frac{V}{A}$$

term as shown in FIG. 5, eliminates the necessity of a timing motor for providing the time term. This circuit is particularly convenient since it eliminates the need for starting and recycling a timing motor. However, it will be appreciated that a timing motor may be substituted for the circuit which provides the $$\frac{V}{A}$$

term for the practice of this invention.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. A system for monitoring the performance of an aircraft during the take-off run comprising acceleration responsive means mounted in said aircraft for providing a signal substantially representative of the forward acceleration experienced by said craft, vertical gyroscopic means mounted in the craft for providing a signal representative of the pitch attitude of the craft, said gyroscopic means being connected to said acceleration responsive means to correct said acceleration signal for changes in the pitch attitude of the craft during the take-off run, erecting means connected to said gyroscopic means for maintaining said gyroscopic means erected to the vertical under normal operation, means for providing a measure of the desired aircraft performance during the take-off run, means responsive to a function of said corrected acceleration signal and said desired aircraft performance measure for providing a comparison therebetween whereby the aircraft performance is monitored during the take-off run, said erection means being responsive to said forward acceleration to thereby erect said gyroscopic means to an undesired false vertical, means connected between said erection means and said comparison means for eliminating the effects caused by said erection means being responsive to said forward acceleration, and means for compensating said pitch attitude signal in accordance with a signal proportional to the erection rate of said erection means.

2. A system for monitoring the performance of an aircraft during the take-off run comprising acceleration responsive means mounted in said aircraft for providing a signal substantially representative of the forward acceleration experienced by said craft, vertical gyroscopic means mounted in the craft for providing a signal representative of the pitch attitude of the craft, said gyroscopic means being connected to said acceleration responsive means to correct said acceleration signal for changes in the pitch attitude of the craft during the take-off run, erecting means connected to said gyroscopic means for maintaining said gyroscopic means erected to the vertical under normal operation, means for providing a measure of the desired aircraft performance during the take-off run, means responsive to a function of said corrected acceleration signal and said desired aircraft performance measure for providing a comparison therebetween whereby the aircraft performance is monitored during the take-off run, said erection means being responsive to said forward acceleration to thereby erect said gyroscopic means to an undesired false vertical, means connected between said erection means and said comparison means for eliminating the effects caused by said erection means being responsive to said forward acceleration, and means responsive to the dynamic pressure for providing a signal representative of the airspeed of said craft, means for providing a signal representative of the maximum erection rate of said erection means, and means responsive to said airspeed, erection rate and desired aircraft performance signals for compensating said pitch attitude signal in accordance with a signal representative of the multiple of the erection rate and the airspeed divided by the desired aircraft performance.

References Cited in the file of this patent

UNITED STATES PATENTS

| | | |
|---|---|---|
| 2,384,761 | Mehan | Sept. 11, 1945 |
| 2,450,320 | Wendt | Sept. 28, 1948 |
| 2,770,452 | Milter | Nov. 13, 1956 |
| 2,922,982 | Hoekstra | Jan. 26, 1960 |

OTHER REFERENCES

Klass: "Monitor Designed to Aid Jet Takeoffs," Aviation Week Magazine, June 23, 1958, pages 65, 67 and 69–70, copy in 73–178.

NACA publication Technical Note 3252, November 1954. (Copy in Scientific Library TL 521 U58.)